Dec. 28, 1926.  1,612,406
E. C. WEISGERBER
CONTROL MEANS FOR FLUID FLOW
Filed April 11, 1925  2 Sheets-Sheet 1

INVENTOR.
Edwin C. Weisgerber,
BY
ATTORNEY.

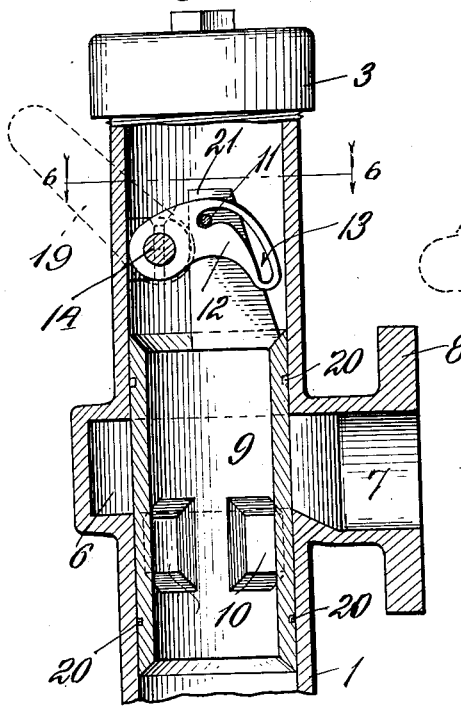
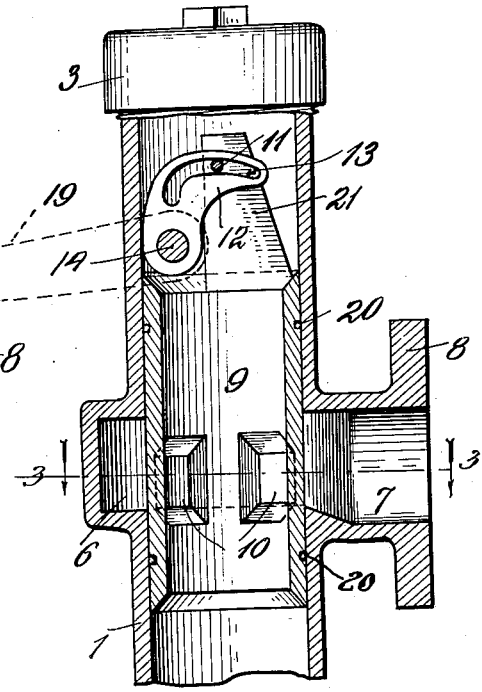
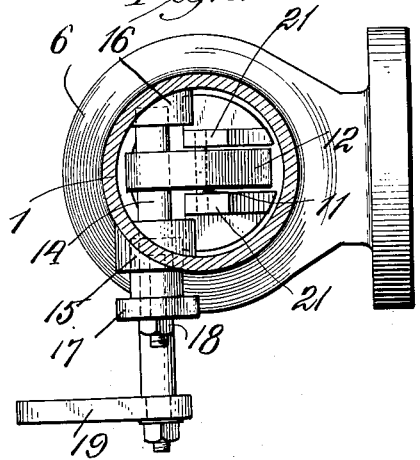
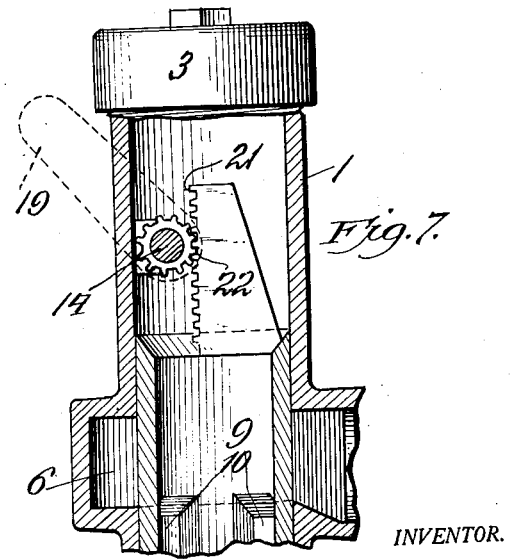

Patented Dec. 28, 1926.

1,612,406

UNITED STATES PATENT OFFICE.

EDWIN C. WEISGERBER, OF LONG BEACH, CALIFORNIA, ASSIGNOR TO PETROLEUM APPLIANCE SYNDICATE, OF LOS ANGELES, CALIFORNIA.

CONTROL MEANS FOR FLUID FLOW.

Application filed April 11, 1925. Serial No. 22,308.

My invention relates to a control means for the flow of fluids, such as gases and oils and it has particular reference to a valve for use on or in connection with separators (not shown) for oils and gases, in regulating the level of liquids, in pressure tanks and automatically controlling the flow of gas.

The object of my invention is to provide a very efficient valve of simple construction, easy and quick assembly and positive operation, in which a very delicate government of the flow of fluids may be had by the action of an arm such as may be moved by a float (not shown), and in which the parts of the valve may be readily assembled or removed for cleaning, repair or substitution without interfering with the tank or container (not shown) of which it may form a complement.

The invention is an improvement over the form of device illustrated and disclosed in my co-pending application for patent of the United States filed January 17, 1925, Serial Number 3,082.

In one of its preferred forms, the invention is shown in the accompanying drawing, in which Fig. 1 is a side view.

Fig. 4 is a sectional view showing the valve member in closed position with respect to the housing.

Fig. 5 is a sectional view showing the valve unit or member in open position with respect to the housing.

Fig. 6 is a plan section on line 6—6 Fig. 4, showing valve operating means.

Fig. 7 is a fragmentary section showing a modified arrangement for operating said valve.

Figure 1:
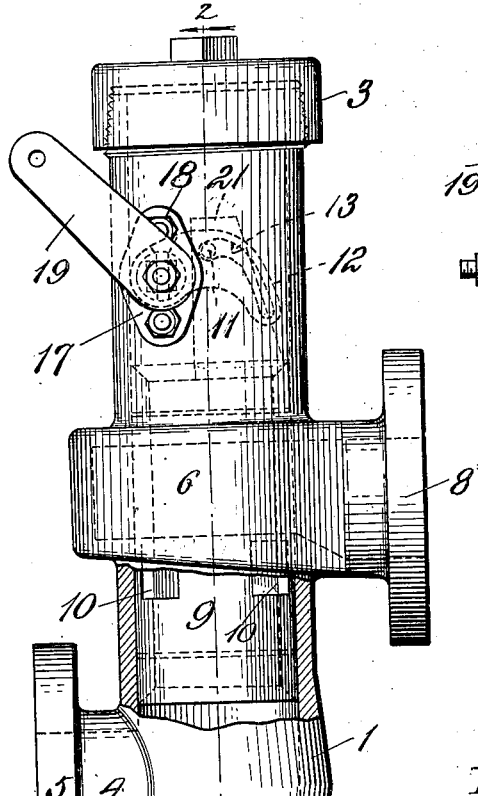
Figure 2:
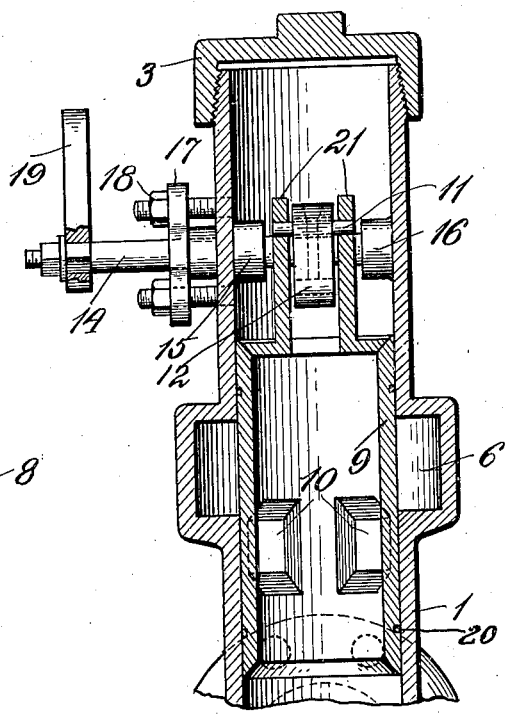
Fig. 2 is a section on line 2—2 Fig. 1, looking in the direction of the arrow, but with parts broken away.
Figure 3:
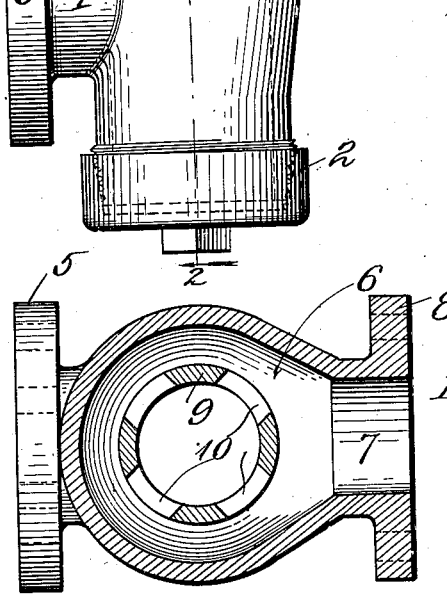
Fig. 3 is a transverse section on line 3—3 Fig. 5 looking in the direction of the arrow.

The invention is applicable principally to e. g., apparatus (not shown) for receiving and separating the constituents of the flow from oil wells; and it differs from the device set out in my co-pending application above referred to, among other essential particulars, in being adaptable and operable outside of said apparatus, whereby the valve may be easily accessible and thus kept in proper working order in maintaining the proper level of the oil within a separator.

The invention is shown in the drawing as comprising an elongated and initially open ended cylinder 1, preferably having a "bottom" cap 2 threading on the cylinder and a "top" cap 3 threading on the cylinder, these caps 2 and 3 provided to permit access to the interior of the cylinder 1 for obvious reasons. The bottom of the cylindrical housing 1, with the cap 2 thereon, forms a settling chamber or trap for grit, sand and other accumulations that may be carried by the oil and may drop out during the passage of the oil from the container, or, where the valve is used to control the flow of the gas accompanying the oil, the bottom of the cylindrical housing 1 may serve to entrap and collect the condensed portions of the gas.

At a point removed a desirable distance from the bottom, the cylindrical housing 1, is provided with an "inlet" 4 through which the oil from a chamber or separator, not shown, may flow into the cylinder 1. This inlet 4 is provided with a flange 5 by which the housing of the valve may be attached to, for example, a chamber or separator. Intermediate its length the cylinder 1 is formed with a chamber 6 which is diametrically larger than the cylinder 1, and which constitutes a pressure equalizing chamber. The chamber 6 is provided with a passage 7, which is preferably flanged as at 8, for convenient attachment to a pipe. Within said housing or cylinder 1 is a tubular valve 9 open at both ends and provided with lateral ports 10 which, by sliding movement of the valve relative to the cylinder 1, are arranged to move into and out of register with the enlarged chamber 6, respectively to permit or shut off the flow of oil therethrough. This valve, is provided, as shown, with equally spaced ports 10, which, when they are in register with the outlet 7, permit the fluid to pass into the enlarged chamber 6, thereby equalizing the pressure on the valve 9.

The valve 9 is provided at some point, as at the upper end thereof, with operating means; and these may comprise a plurality of spaced projections or lugs 21, through and between which may be extended a pin 11. Also extended between said projections or lugs 21, as shown in that form of my invention illustrated in Figs. 1, 2, 4, 5 and 6 is a cam or cam lever 12, having operative connection with said pin 11, as by a slot way 13, whereby upon oscillating said cam or cam lever 12, the valve 9 is reciprocated in and relatively to the cylinder 1 in which it is housed. This cam or cam lever 12 is fixed upon a journal 14, which may extend through said cylinder, and operates in fixed bearings 15 and 16 within said cylinder. Both or either of these bearings, as the bearing 15, may comprise a stuffing box, having on the outside of said cylinder a packing gland 17 adjustable in a usual manner, as by nuts 18. On said journal 14 may be secured means such as a lever 19 for operating same and the valve 9, through the elements just described. It will be obvious that as the journal 14 is rotatively moved, the cam or cam lever 12 connected with the journal will operate the valve 9 relative to the cylinder 1, and thereby control the registry of the ports 10 with the chamber 6, communicating with the "outlet" 7. The valve 9 is preferably provided with annular grooves 20 for packings or for oil to provide lubrication for the valve 9, whereby, under equalization of the pressures within the cylinder 1, the valve may be instantly responsive to the operation of the journal 14.

In the form shown in Fig. 7, instead of providing the lugs 21 with a transverse pin adapted to enter a cam slot, I employ, as an alternative means for converting rotary motion into rectilinear movement, racks integrally or otherwise rigidly connected with said lugs, these racks being engageable by a pinion 22 on the shaft or journal 14; and it should be understood that, in either of the described organizations, the arm 19, or its equivalent, may be secured to the shaft or journal in any desired relationship, according to the direction from which motion is to be transmitted thereto, and according to the sensibility requirements of a particular installation.

Figure 8:
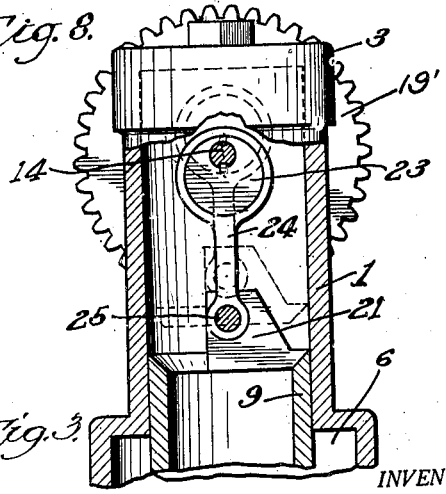
Fig. 8 is a similar section showing another modified arrangement.

Fig. 8 illustrates a further modification in which a rotatable shaft 14 is provided with an eccentric 23, and a connecting rod 24 is pivotally connected at 25 to projections 21', a sprocket gear 19' being suggested as the equivalent of the lever 19 of previous figures.

In the latter connection I may mention that, in the form of my invention first described above, the cam slot 13, although its curvature may ordinarily be essentially that of a logarithmic spiral (intersecting radii at a uniform angle) may, if desired, be varied to produce an increased or a diminished sensibility in any desired region. In the forms shown, an upright position of the valve organization being assumed, and gravity being a factor in the closing of the same, little metal is left standing above the cam slot; but it should be understood that the lugs 21, or their equivalent, may be provided on either end of the tubular valve element 9, and that, when gravity is a factor, it may contribute either to an opening or to a closing movement thereof. The terms "top" and "bottom" and "inlet" and "outlet" as applied to my valve organization, should however be understood as relative to the illustrated positions and movements only, for the reason that organizations of the general character described, comprising an apertured tubular valve element, preferably provided with lubricating channels and movable relatively to an equalizing chamber across which said valve element always extends, may be disposed horizontally or at any desired inclination.

Although it is convenient to regard the cap 2 as a closure for a clean-out opening to which a nipple or pipe of any desired length or any preferred type (not shown) may alternatively be secured, and convenient also to regard the cap 3 as a closure for an inspection opening, it should be understood that, when desired, a fluid or fluids may be admitted or withdrawn through either or both of the mentioned openings at the ends of the cylinder 1, instead of or in addition to the so called "inlet" 4, the valve 9 being in any case effective to control a flow to or from the "outlet" 7.

Especially when my valve is to be used in the handling of fluids containing grit or sticky ingredients, in order to obviate or reduce the danger of rapid wear or danger of a sticking of the valve 9, I consider it a matter of considerable practical importance to provide this element with comparatively sharp bevelled ends to produce a self-scouring effect; and the suggested expedient may also be advantageously employed in connection with the apertures 10, as favorable to rapid flow therethrough; and the housing of my operating means within the cylinder 9 may be advantageous not only as facilitating direct action and suitable lubrication but also as affording protection from accidental or mischievous damage.

Although I have herein described a single complete embodiment of my invention, suggesting various alternative details of construction, of position, or mode of use, it should be understood that various features of my invention may be independently employed; and also that various modifications might be made, by those skilled in the art to which this case relates, without the slightest departure from the spirit and scope of my invention, as the same is indicated above and in the following claims.

I claim as my invention:

1. A valve organization comprising a substantially cylindrical body communicating with a fluid passage and provided with an intermediate enlargement communicating with a second fluid passage; an apertured tubular valve member fitting within said body and longitudinally movable relatively to said enlargement; and means for imparting longitudinal movement to said tubular valve member; and in which valve organization said tubular valve member is provided with bevelled ends always in engagement with the interior of said body.

2. A valve organization as defined in claim 1, in which said tubular valve member, provided with bevelled ends always in engagement with the interior of said body, has the walls of its apertures similarly bevelled.

3. A valve organization comprising: a cylindrical body provided with an intermediate enlargement; a tubular valve therein open at both ends,—said ends being beveled and always in engagement with the interior of said body; and means housed within said body for imparting longitudinal movement to said tubular valve.

4. A valve organization comprising: a cylindrical body, a tubular valve therein; projections extending from said tubular valve; a shaft extending transversely of said cylinder; and means between said projections and said shaft for converting rotary motion of the shaft into rectilinear motion of said tubular valve.

5. A valve organization comprising: a cylindrical body having a tubular valve therein, in which organization said cylindrical body is provided with four openings, two of which openings are terminal and normally closed but are capable of use, when open, as inlet or outlet openings, the other two openings being laterally disposed.

6. A valve organization comprising a cylindrical body having a tubular valve therein in which said cylindrical body is provided with an end opening having a removable closure and suitable for use as a clean-out opening, and in which said tubular valve and said body are respectively provided with opposable lateral openings which are adapted to be brought into coincidence, to permit advance of the controlled fluid therethrough.

7. A valve organization comprising a cylindrical body having a tubular valve therein in which said cylindrical body is provided with an end opening having a removable closure and suitable for use as an inspection opening, and in which said tubular valve and said body are respectively provided with opposable lateral openings which are adapted to be brought into coincidence, to permit advance of the controlled fluid therethrough.

8. A valve comprising a cylinder having at the ends thereof removable closures, and provided near one end thereof with an inlet, said cylinder formed centrally of its length with a pressure equalizing chamber diametrically larger than said cylinder and having an outlet communicating with said chamber, a tubular valve within said chamber open at both ends and having lateral ports arranged for communication with said chamber and the outlet formed thereon, and means for sliding said valve within said cylinder.

9. A valve comprising a cylinder having an inlet near the bottom thereof and means closing the bottom of said cylinder to provide a settling chamber, said cylinder formed intermediate its length with a chamber diametrically larger than said cylinder and an outlet communicating with said chamber, a hollow cylindrical valve within said cylinder and provided with lateral ports arranged to communicate with said chamber and outlet, and means in said cylinder for slidably moving said valve within said cylinder.

10. A valve comprising an elongated cylinder having an inlet near the bottom thereof, a closure for the bottom of said cylinder to provide a settling chamber, said cylinder formed intermediate its length with a circular chamber diametrically larger than said cylinder and an outlet communicating with said chamber, a hollow cylindrical valve within said cylinder and open at both ends, said valve having lateral ports arranged to communicate with said chamber and outlet and formed with spaced projections, and means engaging said spaced projections to slide said valve within said cylinder.

11. A valve comprising an elongated cylinder having an inlet near the bottom thereof and an outlet intermediate its length, a closure for the bottom of said cylinder to provide a settling chamber therein, a tubular valve slidable within said cylinder and having lateral ports, said valve provided at one end thereof with spaced projections and with means engaging said projections for slidably operating said valve from a journal upon which a rotating means is mounted.

In testimony whereof, I have hereunto set my hand at Los Angeles, California, this 31st day of March, 1925.

EDWIN C. WEISGERBER.